(No Model.)
D. C. WHEELER.
SHEARS.
No. 565,193.             Patented Aug. 4, 1896.
Fig. 1.
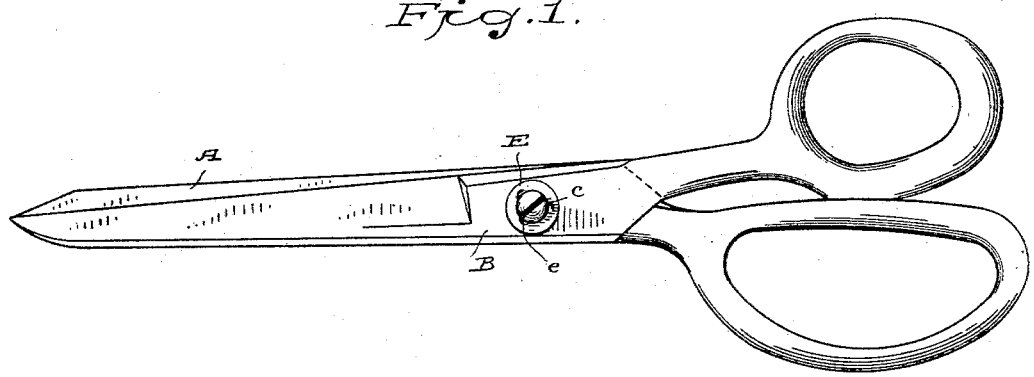
Fig. 2.
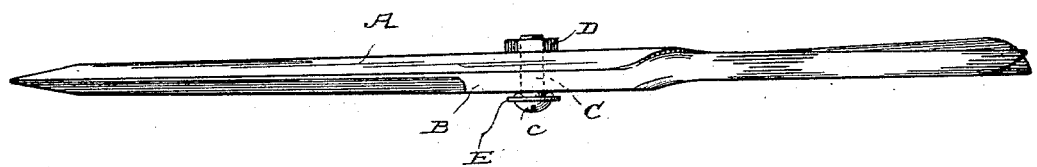
Fig. 3.
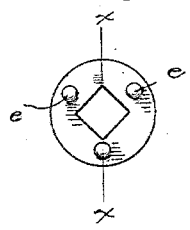
Fig. 4.
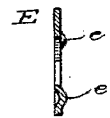
Fig. 5.     Fig. 6.
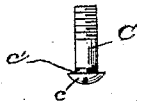 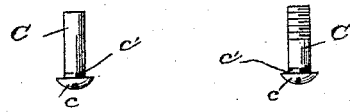
WITNESSES
H. A. Lamb
S. V. Richardson
INVENTOR
David C. Wheeler
By A. M. Wooster
Atty.

UNITED STATES PATENT OFFICE.

DAVID C. WHEELER, OF BRIDGEPORT, CONNECTICUT, ASSIGNOR TO THE ACME SHEAR COMPANY, OF SAME PLACE.

SHEARS.

SPECIFICATION forming part of Letters Patent No. 565,193, dated August 4, 1896.

Application filed May 12, 1896. Serial No. 591,217. (No model.)

*To all whom it may concern:*

Be it known that I, DAVID C. WHEELER, a citizen of the United States, residing at Bridgeport, in the county of Fairfield and State of Connecticut, have invented certain new and useful Improvements in Shears; and I do hereby declare the following to be a full, clear, and exact description of the invention, such as will enable others skilled in the art to which it appertains to make and use the same.

My invention has for its object to so improve the construction of shears that, without appreciable addition to the cost of construction, the cutting edges shall be held closely in contact during the entire length of the cut. This I accomplish by means of a metal washer which is fixed to the stud and bears against the movable blade, the novel feature of construction being that the washer is provided with a plurality of smoothly-rounded contact-points which are formed by pressing out the metal of the washer itself. This special form of contact of the washer with the movable blade reduces the friction to the lowest possible amount and secures the best possible results in the least expensive manner, as, owing to the plurality of contact-points, the washer will adapt itself to varying thicknesses and uneven surfaces of the movable blades, it being of course understood that it is impossible to make the blades uniform, as they are ground by hand.

In the accompanying drawings, forming part of this specification, Figure 1 is a plan view, and Fig. 2 an edge view, of a pair of shears embodying my invention; Fig. 3, an elevation, on a greatly-enlarged scale, of the washer detached; Fig. 4, a section on the line $x\,x$ in Fig. 3; Fig. 5, a view of an unthreaded stud, and Fig. 6 is a view of a threaded stud.

A denotes the fixed blade of the shears, B the movable blade, and C the stud which is fixed in blade A, but upon which blade B turns freely. I have shown the stud as made longer than the thickness of the two blades and its outer end as engaged by a nut D.

Stud C may be rigidly fixed in blade B by upsetting the metal of the stud and causing it to closely fill the opening in the blade, or, if preferred, the stud may be threaded, as in Fig. 6, so that it will engage both the fixed blade and the nut.

The gist of my invention lies in placing between the head of the stud, which I have indicated by $c$, and the surface of the movable blade a washer E, which is made of thin metal, such as thin steel, and is provided with a plurality of smoothly-rounded contact-points $c$, which bear upon the surface of the blade. These contact-points are formed by pressing out the metal of the washer. In practice I ordinarily use three contact-points, which I have found quite sufficient, although more may be used, if preferred. The opening through the washer is made angular, and the stud is provided just under the head with an angular portion $c'$, which holds the washer against rotation on the stud.

Having thus described my invention, I claim—

The combination with a pair of shear-blades, of a stud threaded to engage one of said blades and a nut exterior to said blade and having a head at its other end, and under said head an angular portion and a washer engaging the angular portion and provided with a plurality of smoothly-rounded contact-points which bear upon the movable blade as and for the purpose set forth.

In testimony whereof I affix my signature in presence of two witnesses.

DAVID C. WHEELER.

Witnesses:
S. V. RICHARDSON,
A. M. WOOSTER.